United States Patent [19]

Spill

[11] Patent Number: 4,619,468
[45] Date of Patent: Oct. 28, 1986

[54] COVER FOR A SEATBELT OF AN AUTOMOBILE

[76] Inventor: Horst Spill, 702 - 261 Queen St., Winnipeg, Manitoba, Canada, R3J 3R1

[21] Appl. No.: 693,536

[22] Filed: Jan. 22, 1985

[51] Int. Cl.$^4$ .............................................. B60R 21/00
[52] U.S. Cl. .................................... 280/801; 280/808; 297/483; 297/488
[58] Field of Search ............... 280/801, 803, 806, 808; 297/483, 482, 488

[56] References Cited

U.S. PATENT DOCUMENTS 3,957,282  5/1976  Finnigan .............................. 297/483
4,057,181 11/1977  Finnigan .............................. 297/482
4,319,769  3/1982  Compeav ............................. 280/803

FOREIGN PATENT DOCUMENTS 861337  1/1971  Canada .

Primary Examiner—Richard A. Bertsch
Attorney, Agent, or Firm—Ade & Company

[57] ABSTRACT

A cover for the seatbelt of an automobile of the type having a lap strap and a diagonal body strap comprising a pair of tubular sleeve members with a longitudinal slit so that the sleeve members can be opened and wrapped around the lap and diagonal straps respectively. Each sleeve member includes an inner surface formed a pile fabric material preferably natural fur which thus can engage the body of the occupant to prevent or reduce the strap from cutting or rubbing a fur coat worn by the occupant.

3 Claims, 4 Drawing Figures

COVER FOR A SEATBELT OF AN AUTOMOBILE

BACKGROUND OF THE INVENTION

This invention relates to a cover for the seatbelt of an automobile.

In many countries and many states laws are being introduced concerning the compulsory use of seatbelts while travelling as an occupant of an automobile. Such seatbelts generally comprise a diagonal torso strap portion and a lap strap portion which are wrapped around the occupant and fastened by a buckle at one side of the occupant. In most cases the belts are supplied on reels so as to be retractable with suitable inertia sensing devices for locking the straps in position when required.

Use of the belts has therefore increased substantially both in view of the laws and in view of an increasing public awareness of the improved safety obtained by wearing such belts.

A serious drawback with such strap type seatbelts has however been found in that the plastic webbing type strap used to provide the necessary strength is severely damaging to fur coats and to a lesser extent other clothing worn by the occupant while the strap is wrapped around the occupant. Normally the retraction effect of the reels causes the belt to be drawn back against the occupant so that it constantly rubs against the occupant upon any movement. The plastic webbing type belt therefore tends to cut the delicate hairs of an expensive fur coat thus rapidly wearing the coat at the position of the lap belt and the diagonal torso belt. This rapid wear at a specific point can very soon become visually apparent thus requiring expensive repair or even replacement of a badly damaged coat.

SUMMARY OF THE INVENTION

It is one object of the present invention, therefore, to provide a cover for such seatbelts which can be used to reduce or avoid the damage to fur coats caused by the straps.

According to a first aspect of the invention, therefore, there is provided a cover for a seatbelt of an automobile particularly for use with a fur coat worn by an occupant, the cover comprising a tubular sleeve member for surrounding a strap part of the seatbelt having a length sufficient to extend over the lap or diagonally of the torso of an occupant, the sleeve member being slit longitudinally so that it can be wrapped around the strap part and including fastening means for closing the slit so that the sleeve member can remain wrapped around the strap part to define an inner surface lying on one side of the strap for contacting the occupant, an outer surface lying on the other side of the strap for facing away from the occupant, the inner surface being formed from a pile fabric whereby to engage the fur coat and reduce wear on the coat from contact with the belt.

According to a second aspect of the invention there is provided a cover for a seatbelt strap of an automobile particularly for use with a fur coat worn by an occupant, the cover comprising an elongate flexible fabric rectangular layer having a length of the order of 24 to 27 inches, a central strip along the length thereof being formed from a pile fabric material having a width of the order of 2 inches for lying along one side of the strap, a first strip along one side of the central strip and a second strip along the other side of thereof each being formed from a non-pile fabric material including along an edge thereof remote from the central strip one of a pair of cooperating fastening means whereby the cover can be wrapped around the strap to form a sleeve with the pile fabric inner-most for engaging the coat.

According to a third aspect of the invention there is provided a seatbelt of an automobile comprising a strap and means for fastening the strap around an occupant of the automobile, the seatbelt having on an inner surface thereof for engaging the occupant a layer of a pile fabric material.

By the very simple provision, therefore, of a pile fabric layer, most preferably of a natural fur material, on the inner surface of the belt, practically all rubbing and cutting of the fur fibers is prevented thus avoiding damage to the fur coat at the strap positions. Synthetic fibres while possibly providing some advantage will tend to cut natural fur fibres and hence a layer of natural fur is much preferred. Sheepskin from a young milk fed lamb can be used.

Preferably the layer is formed by a cover with an outer surface which is plain or non-pile fabric so as to reduce the bulk of the cover.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
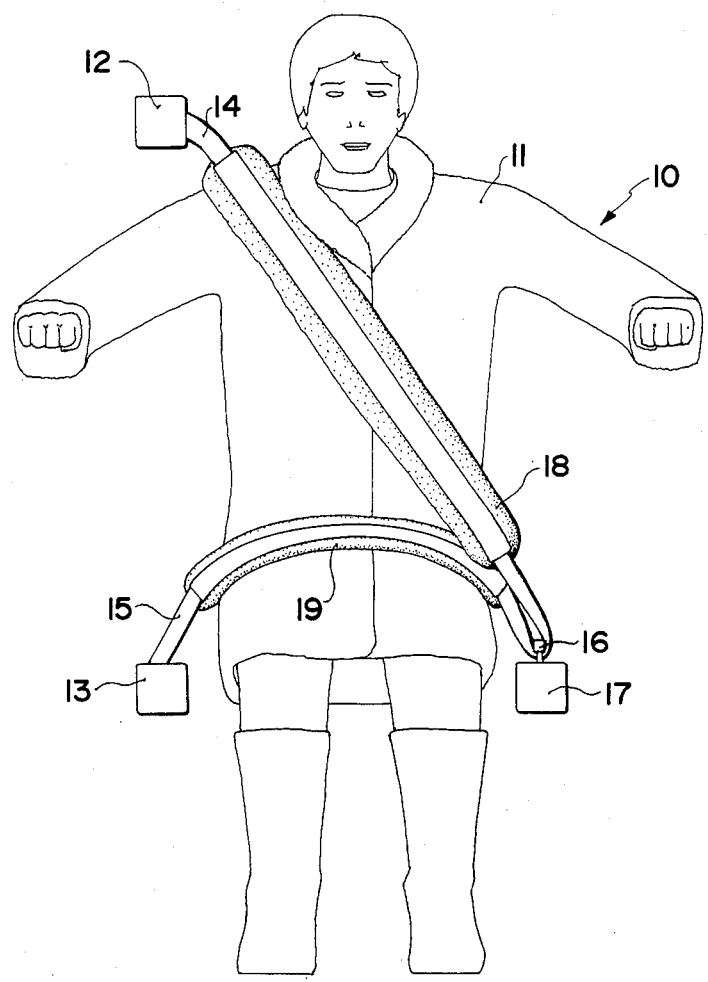
FIG. 1 is a front view of an occupant of a motor vehicle wearing a fur coat and using the seatbelt including a cover according to the present invention.

An occupant of a motor vehicle is shown in FIG. 1 and indicated generally at 10 wearing a fur coat of any suitable design indicated at 11. The occupant is seated in the conventional automobile seat and is wearing a conventional seatbelt arrangement including a pair of supply reels 12 and 13 supplying respectively a diagonal strap 14 and a lap strap 15 both of which lead to a buckle 16 which attaches to a receptacle 17 usually mounted centrally of the vehicle.

The straps 14 and 15 are generally manufactured from a plastic webbing material which is necessary to provide the required strength to prevent breaking of the straps under the large loads developed in an accident situation.

In order to prevent the strap from rubbing the fur coat 11 at the waist and across the torso of the occupant each of the straps 14 and 15 is covered by a cover generally indicated at 18 and 19 respectively.

Figure 3:
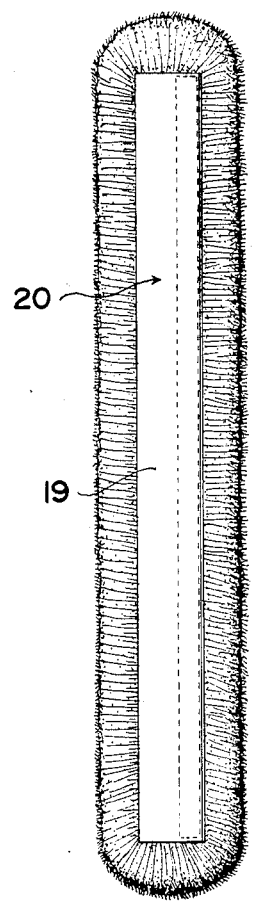
FIGS. 3 and 4 are front elevational and rear elevational views respectively of the covers of FIG. 1.
Figure 4:
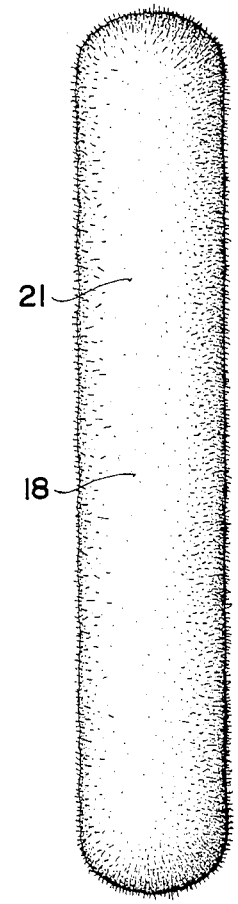
Figure 2:
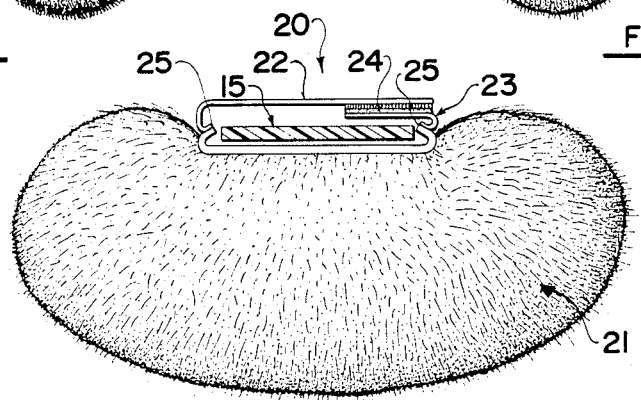
FIG. 2 is a cross sectional view along the lines 2—2 of FIG. 1.

Turning now to FIGS. 2, 3 and 4 the covers are shown in greater detail. The covers thus comprise a front surface 20 and a rear surface 21. The front surface 20 is formed from any suitable fabric material which is smooth or non-pile and can be chosen to match the interior of the vehicle or for other generally aesthetic reasons. The front surface 20 is formed in two portions including a larger portion 22 and a smaller portion 23 each of which carries along an edge one of a pair of cooperating hook and loop strips of a conventional type one of which is known under the trademark "Velcro". Thus the portions 22 and 23 provide an overlapping strip at the fastening mechanism generally indicated at 24 so the fastening strips of hook and loop fabric are covered by the larger front portion 22.

The front portions 22 and 23 are attached to the rear portion 21 by any suitable technique for example sewing at a stitch line 25 which is arranged at or slightly inwardly of the edges of the belt strap 15.

The rear portion 21 is formed from a pile fabric and preferably a natural fur material which is thus least damaging to the fur of the fur coat. For example a sheepskin material can be used as a cheaper form of fur. Alternatively, a more expensive fur material could be used or a less expensive fabricated or simulated fur material.

The cover includes two such tubular sleeve members 18 and 19 each of which is of a length of the order of 24 to 27 inches which has been found to be suitable to cover the straps over a sufficient length to avoid their contacting the fur coat while not seriously interfering with the retraction of the belt onto the reels 12 and 13. The width of the rear cover portion 21 is preferably of the order of two inches which is substantially equal to the width of the strap so that the front cover portion 22, 23 wraps around the strap and fully encases the strap in the position shown in FIG. 2.

In use the covers can be applied by the purchaser to the straps merely by separating the hook and loop fastening mechanism 24, wrapping the cover around the strap and reclosing the fastening mechanism to obtain the desired orientation of the cover relative to the strap so that the fur layer is arranged inner most to contact the occupant's body.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A combination of a seatbelt strap and a cover for the seatbelt strap of an automobile particularly for use with a fur coat worn by an occupant, the strap including means arranged to fasten around the occupant such that part of the strap contacts and restrains the occupant, the cover comprising an elongate flexible fabric rectangular layer having a length of the order of 24 to 27 inches, a central strip along the length thereof being formed from a natural fur pile fabric material having a width of the order of 2 inches for lying along one side of the strap, a first strip along one side of the central strip and a second strip along the other side thereof each being formed from a non-pile fabric material including along an edge thereof remote from the central strip one of a pair of cooperating fastening means the cover being wrapped around the strap to form a sleeve with the pile fabric inner-most for engaging the coat, whereby the only engagement of clothes of the occupant by said seatbelt is by said fur fabric.

2. The invention according to claim 1 wherein the fastening means comprises a pair of cooperating strips, one being formed with a plurality of hooks and the other with a plurality of loops.

3. The invention according to claim 1 wherein the cover includes a second elongate flexible fabric rectangular layer similar to the first layer.

* * * * *